(12) United States Patent
Schonmeier et al.

(10) Patent No.: US 7,273,432 B2
(45) Date of Patent: Sep. 25, 2007

(54) BELT TENSIONER

(75) Inventors: Horst Schonmeier, Gelnhausen (DE); Michael Fischer, Fellen (DE)

(73) Assignee: Litens Automotive GmbH, Gelnhausen (DE)

( * ) Notice: Subject to any disclaimer, the term of this patent is extended or adjusted under 35 U.S.C. 154(b) by 597 days.

(21) Appl. No.: 10/751,867

(22) Filed: Jan. 6, 2004

(65) Prior Publication Data
US 2005/0146127 A1    Jul. 7, 2005

(51) Int. Cl.
*F16H 7/12* (2006.01)

(52) U.S. Cl. .................. 474/135; 474/133; 474/117; 474/112

(58) Field of Classification Search ............... 474/101, 474/109, 112, 113–117, 133, 135; 264/275–278; 411/369, 918; 508/107; 429/188, 145
See application file for complete search history.

(56) References Cited

U.S. PATENT DOCUMENTS

| | | | |
|---|---|---|---|
| 4,689,037 A * | 8/1987 | Bytzek | 474/135 |
| 4,934,988 A * | 6/1990 | Kawamura et al. | 474/117 |
| 5,620,385 A * | 4/1997 | Cascionale et al. | 474/112 |
| 6,932,731 B2 * | 8/2005 | Kaiser et al. | 474/135 |

FOREIGN PATENT DOCUMENTS

| | | | |
|---|---|---|---|
| DE | A 26 08 277 | 1/1977 | |
| DE | A 40 10 928 | 10/1991 | |
| DE | A 43 27 141 | 2/1995 | |
| DE | A 19 52 4403 | 3/1997 | |
| EP | 0967412 A2 * | 12/1999 | |
| FR | 1493776 A * | 9/1967 | |
| FR | 2549915 A1 * | 1/1985 | 403/408.1 |
| JP | 4-347042 A * | 12/1992 | 474/135 |
| JP | 2000-337385 A * | 12/2005 | |
| WO | WO94/25779 A1 * | 10/1994 | 474/135 |

* cited by examiner

*Primary Examiner*—Marcus Charles
(74) *Attorney, Agent, or Firm*—Clark Hill PLC

(57) ABSTRACT

A belt tensioner with a retainer can be brought into contact with a belt via a belt support for applying a tensile force. The retainer is joined at a distance from the belt support to a radial plain bearing and it can be swivelled about the axis of rotation of the radial plain bearing, whereby the tensioning and swivel movements of the belt support occur under the action of a coil spring. For a belt tensioner of this type, which with a compact construction runs essentially wear-free, it is suggested that the retainer is subject to the action of a spring, which exerts a force ($F_3$) essentially parallel to the axis of rotation on the retainer, the said force ($F_3$) counteracting the force ($F_1$) exerted by the belt on the retainer.

20 Claims, 1 Drawing Sheet

BELT TENSIONER

BACKGROUND OF THE INVENTION

1. Field of the Invention

The invention relates to a belt tensioner of the type for automotive vehicles.

2. Description of the Related Art

Typical belt tensioners are known, for example from DE-A-43 27 141 or DE-A-40 10 928. These belt tensioners are employed in motor vehicles for tightening the V-belt and comprise a retainer with a tension arm, which is fitted with an idler pulley at one end, that is applied to the belt, and which is joined to a radial plain bearing at its other end. The radial plain bearing includes a bearing bush part and a bearing pin part, whereby one of the parts is fixed to the tension arm and the other part is held spatially fixed. A rotary spring in the form of a spiral coil spring is wrapped coaxially around the bearing bush and bearing pin and is held by one end on the retainer and held spatially fixed at the other end. These known belt tensioners are fitted in a state in which the bearing bush and the bearing pin have been rotated against one another under the pretension of the rotary spring, so that the idler pulley already exerts a predetermined force on the belt. Due to the spring force of the pretensioned rotary spring, the belt is held under a predetermined tension, but the idler pulley can deflect or take up the slack if the length of the belt changes.

Due to the type of construction, the tension arm bearing the belt idler pulley must, however, be arranged off center in relation to the axial length of the radial plain bearing on the bearing bush or bearing pin. Consequently, the radial plain bearing is, however, stressed by tilting forces which cause increased wear. Attempts have been made in DE-A-43 27 141 to arrange the deflecting point of the swivel spring in the axial direction to the rotating axis so far removed from the radial plain bearing that the resultant of the force introduced into the radial plain bearing meets approximately the center of the axial length of the radial plain bearing. This is however only possible where there is sufficient installation space available.

The object of the invention is to develop a belt tensioner such that the susceptibility to wear is reduced with a compact, short construction.

SUMMARY OF THE INVENTION

According to one aspect of the invention, a belt tensioner is provided with a retainer which can be brought into contact with a belt via a belt support for applying a tensile force and which, at a distance from the belt support, is connected to a radial plain bearing and can be swivelled about its axis of rotation, whereby the tensioning and swivel movements of the belt support occur under the load of a coil spring. The invention is characterized in that the retainer is subject to the action of a spring, which exerts a force essentially parallel to the axis of rotation on the retainer and the force counteracting upon the force exerted by the belt on the retainer.

According to the invention the retainer is subject to the action of a spring which acts against the tilting moment which is caused by the force exerted through the belt on the retainer. The application of this spring is possible with a compact construction, so that the installation space required for fitting does not need to be enlarged.

Although belt tensioners are already known which exhibit more than one spring, such as for example the belt tensioner according to DE-A-26 08 277, the springs in this case, however, have a different function. With this known belt tensioner, a first compression spring is used which presses friction discs against the retainer and whose spring force defines a threshold value at which the retainer can only then be swivelled. The belt tensioner also has a second compression spring which is formed as a spring strut and presses the idler pulley directly against the belt.

The application of springs, which act on the retainer essentially parallel to the rotating axis, is for example known with a belt tensioning arm according to DE-A-195-24-403. Here however, this spring is used as a single spring and in its function replaces the rotary spring of the generic state of the art, i.e. the tensile force is determined through the pretension of the cup spring.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
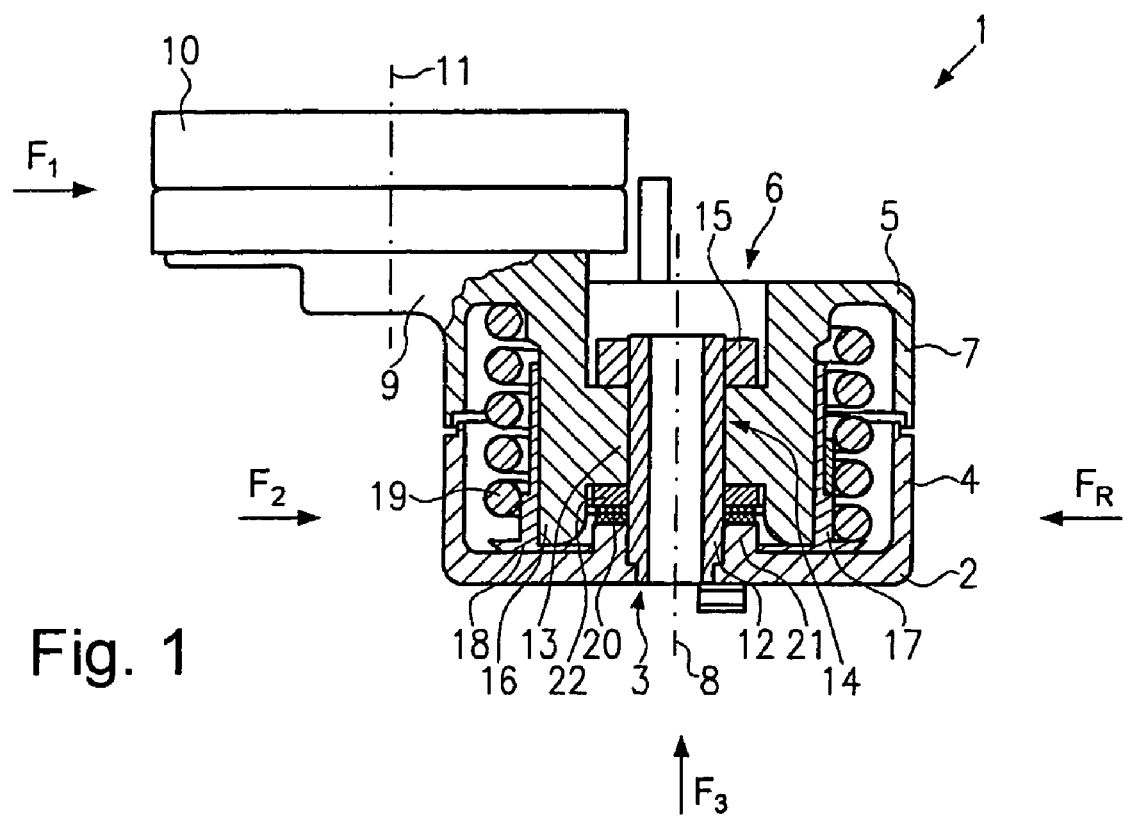
FIG. 1 a partial cross-section through a first embodiment of a belt tensioner according to the invention, and FIG. 2 a partial cross-section through a second embodiment of a belt tensioner according to the invention.

FIG. 1 illustrates a belt tensioner 1 in partial cross-section as it is used, for example, for tensioning belts in automotive vehicles. The belt tensioner 1 is however also suitable for other applications where belts, chains or other endless transmission elements need to be tensioned.

The belt tensioner 1 includes a base section 2 which is provided with a central opening 3 and cup-shaped, high-reaching walls 4 which form part of a housing. The belt tensioner 1 also includes a retainer 5, which also exhibits a central opening 6 and cup-shaped high-reaching side walls 7, whereby the walls 4 and 7 are formed such that they form the outer boundary of the belt tensioner 1 and the center lines of the openings 3 and 6 meet in a common center line 8.

The retainer 5 is also provided with a tension arm 9 which is mounted in the axial direction asymmetrically and is offset from the center line 8 on the retainer 5 and protrudes over the wall 7. An idler pulley 10 is rotationally supported about an indicated axis 11 in the tension arm 9. The idler pulley 10 forms a belt support for the belt to be tensioned, whereby the axis 11 runs parallel to the center line 8.

One end of a hollow bearing pin 12 is mounted in the opening 3 of the base section 2, preferably by caulking. A screw, which is not shown, can be passed through the hollow bearing pin 12, enabling the belt tensioner 1 to be firmly mounted onto an engine part of a motor vehicle or similar.

The retainer 5 with a bearing bush 13 sits on this hollow bearing pin 12, whereby the bearing bush 13 and bearing pin 12 can be displaced relative to one another in the axial direction and the inner surface of the bearing bush 13 forms a radial plain bearing 14 with the outer surface of the bearing pin 12, so that the retainer 5 can rotate about the bearing pin 12, whereby the center line 8 forms the axis of rotation. The retainer 5 is held by a locking piece 15 in the form of a disc on the bearing pin 12, the disc forming a positive locking joint with the free end of the bearing pin 12 opposite the base section 2.

The retainer 5 also includes a friction cone 16 which extends coaxially on the center line 8 and on which a spring bush 17 and a coil bush 18 are arranged in a normal manner, carrying a rotary spring 19 in the form of a spiral-coil spring. The rotary spring 19 is, as is usual with belt tensioners of this type, attached at one end to the base section 2 and to the retainer 5 at its other end, so that tensioning can be provided through the relative rotation of the retainer 5 and the base section 2. The function and the operation of tensioning with the aid of this type of coil spring is known to the specialist so that further details need not be supplied here.

Through the tensioning of the belt it exerts a force F1 on the retainer 5. Since the bearing bush 13 is spaced in the axial direction from the idler pulley 10 with regard to the axis of rotation 8, and since, compared to the belt tensioner 1 of the generic state of the art according to DE 43 27 141, the friction cone 16 and therefore the lower mounting point of the coil spring 19 for introducing a counter force F2 in the axial direction of the axis of rotation 8 is located closer to the bearing bush 13 than the idler pulley 10, this would lead to a resultant force, which is applied off center on the plain bearing 14, and would therefore cause a tilting moment, which would lead to increased wear of the radial plain bearing 14.

To prevent this, the bearing bush 13 of the radial plain bearing 14 has a shorter axial length than the intervening space between the locking disc 15 and the base section 2 in the region around the opening 3. In the axial intervening space produced by this, a spring 20 is arranged which is formed as a ring-shaped cup or Belleville spring on which the bearing pin 12 is located and acts symmetrically on the axis of rotation 8. In the region of this Belleville spring 20 preferably the base section 2 is fitted with a base 21 which acts as a thrust pad so that the Belleville spring 20 is evenly compressed. The Belleville spring 20 acts via a supporting ring 22 on the bearing bush 13 such that a force $F_3$ can be exerted on the bearing bush 13 parallel to the axis of rotation 8, the force $F_3$ supporting $F_2$ as counter force for the introduced force F1 transferred from the belt, so that essentially a resulting force $F_R$ aligned to the axial center of the radial plain bearing 14 is produced with which a tilting moment is essentially not produced.

During assembly, the force $F_3$ can be set variably via the spring displacement of the Belleville spring 20, whereby values between about 4000 to 7000 N are preferred.

The Belleville spring 20 acts via the supporting ring 22 on a face of the bearing bush 13 and presses it against the locking disc 15 which acts as an abutment. Here, the sides facing one another are formed as axial plain bearings between the locking disc 15 and the bearing bush 13 or between the bearing bush 13 and the supporting ring 22. These axial plain bearings preferably have steel surfaces which are coated with PTFE. Depending on the type of coating, these plain bearings can also however contribute to friction damping, so that the applied damping is split between the damping due to the coil spring 19 and the damping due to friction.

The plain bearings can also be provided by separate discs and/or in another axial position.

Figure 2:
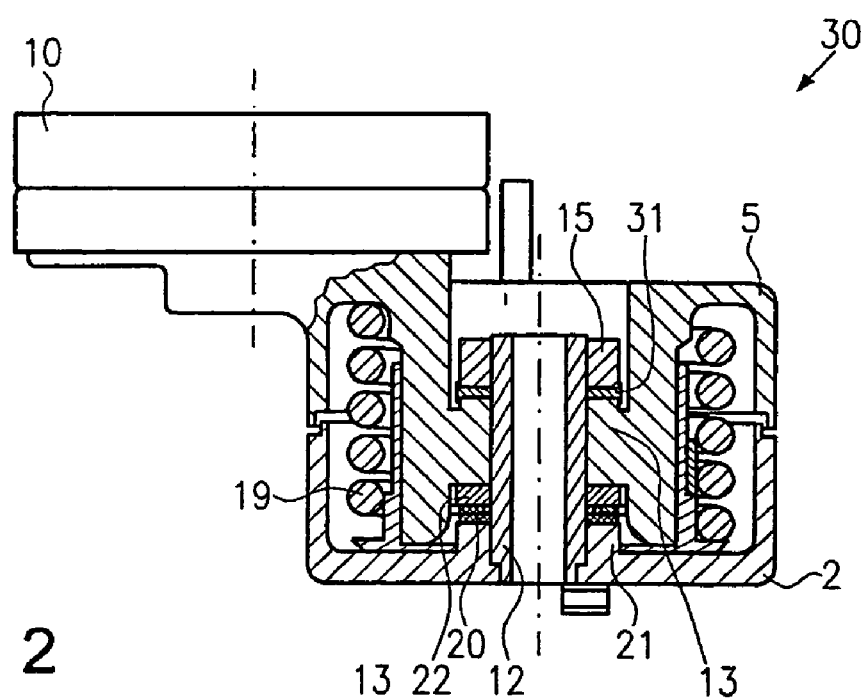

In an illustration similar to FIG. 1, FIG. 2 shows a second embodiment of a belt tensioner 30, whereby components similar to the first embodiment are identified with the same reference symbols and are not explained again.

The belt tensioner 30 differs from the belt tensioner 1 only due to the fact that here an additional, increased friction damping is produced by the arrangement of a special damping washer 31. The damping washer 31 is preferably placed between the bearing bush 13 and the locking disc 15, whereby, due to the Belleville spring 20, the bearing bush 13 is pressed via the supporting ring 22 against the damping washer 31 which it presses against the locking disc 15. This arrangement is particularly advantageous where additional friction damping is required due to very high application-related requirements. Here, friction damping values of up to 60% of the tensile force or the torque can be produced. Wear-free functioning can be ensured due to tuning the damping via the coil spring 19 on one hand and via the Belleville spring 20 on the other, or due to splitting of the damping between both systems, despite an overall damping value of 85% referred to the torque.

An advantageous material pairing for the damping washer 31 and the adjacent locking disc 15 is for example a glass-fibre reinforced polyamide, in particular PA 46 with 5% glass-fibre content, for the damping washer 31 and a stainless steel, in particular V2A, for the locking disc 15. The plain bearings, which are arranged in this case between the bearing bush 13 and the damping washer 31 or between the bearing bush 13 and the supporting ring 22, can, as with the first embodiment, have bearing surfaces of steel coated with PTFE, which, where required, are arranged on additional washers not illustrated in the drawings.

In a modification of the described and drawn embodiments a different sequence of the components is possible. For example, the Belleville spring 20 can be arranged on the side of the bearing bush 13 facing the locking disc 15. Instead of a Belleville spring a different suitable spring can be used. The selection of materials can be carried out with regard to the service life to be achieved and/or to the required damping values. The invention can furthermore be applied when the tension arm 9 is joined to the bearing pin 12.

What is claimed is:

1. A belt tensioner comprising:
   a cup shaped base section having a hollow bearing pin;
   a retainer pivotally mounted on said bearing pin for rotation about a first axis, said retainer having a radial plain bearing frictionally engaging said bearing pin, said retainer being movable in an axial direction along said bearing pin, and said retainer having an idler pulley mounted for rotation about a second axis, said second axis being offset from and parallel to said first axis;
   a coil spring extending between said base section and said retainer, said coil spring urging said retainer to rotate about said first axis and bias said idler pulley into engagement with a belt;
   a spring bush and a coil bush supporting said coil spring on said retainer and said base section, respectively;
   a locking piece forming a locking joint on a free end of said bearing pin, presenting a hollow passageway through said tensioner enabling said tensioner to be mounted on an engine part; and
   a Belleville spring mounted about said bearing pin, said Belleville spring axially urging said retainer against said locking piece.

2. A belt tensioner according to claim 1, wherein said belt exerts a force $F_1$ on said idler pulley, said coil spring exerts a force $F_2$ on said retainer, and said Belleville spring exerts a force $F_3$ on said retainer essentially parallel to said first axis of rotation, whereby the forces $F_2$ and $F_3$ counter force $F_1$, such that the resultant force $F_R$ is aligned with said radial plane bearing at an axial center thereof, preventing tilting movement of said retainer relative to said bearing pin.

3. A belt tensioner according to claim 2, wherein said retainer comprises a bearing bush, said bearing bush having said radial plane bearing and an opposed pair of axial plain bearings.

4. A belt tensioner according to claim 3, further comprising a supporting ring mounted on said bearing pin, wherein a first of said pair of axial plane bearings engages said locking piece and said supporting ring engages said Belleville spring and a second of said pair of axial plane bearings.

5. A belt tensioner according to claim 4, wherein said retainer comprises an axially extending friction cone, said friction cone supporting said spring bush and said coil bush.

6. A belt tensioner according to claim 5, wherein each of said pair of axial plane bearings is coated with PTFE.

7. A belt tensioner according to claim 6, wherein said base section has a thrust pad supporting said Belleville spring, said thrust pad cooperating with said Belleville spring for even compression thereof.

8. A belt tensioner according to claim 2, wherein said locking piece is spaced along said bearing pin to compress said Belleville spring to produce said force $F_3$ having a predetermined value.

9. A belt tensioner according to claim 8, wherein said predetermined value is selected from a range of between about 4000 to 7000N.

10. A belt tensioner according to claim 1, wherein said spring bush is arranged normal to said coil bush.

11. A belt tensioner according to claim 10, wherein said spring bush is integral with said coil bush.

12. A belt tensioner according to claim 1, wherein said retainer has a cup and said retainer and said base section cooperate to form an outer boundary of said tensioner, surrounding said coil spring.

13. A belt tensioner according to claim 1, wherein said belt tensioner further comprises a damper washer disposed between said locking piece and said retainer.

14. A belt tensioner according to claim 13, wherein said damper washer comprises a glass-fibre reinforced plastic.

15. A belt tensioner according to claim 14, wherein said damper washer comprises a polyamide with about 5% glass-fibre content.

16. A belt tensioner comprising:
a cup shaped base section having a hollow bearing pin and a thrust pad;
a retainer pivotally mounted on said bearing pin for rotation about a first axis, said retainer comprising a bearing bush having a radial plain bearing frictionally engaging said bearing pin and an opposed pair of axial plain bearings, said retainer being movable in an axial direction along said bearing pin, said retainer comprises an axially extending friction cone, and said retainer having an idler pulley mounted for rotation about a second axis, said second axis being offset from and parallel to said first axis;
a coil spring extending between said base section and said retainer, said coil spring urging said retainer to rotate about said first axis and bias said idler pulley into engagement with a belt;
a spring bush and a coil bush supporting said coil spring on said retainer and said base section, respectively, said friction cone supporting said spring bush and said coil bush;
a locking piece forming a locking joint on a free end of said bearing pin and presenting a hollow passageway through said tensioner enabling said tensioner to be mounted on an engine part, said locking piece engaging a first of said pair of axial plane bearings;
a Belleville spring mounted about said bearing pin, said Belleville spring engaging said thrust pad and axially urging said retainer towards said locking piece; and
a supporting ring mounted on said bearing pin, said supporting ring engaging said Belleville spring and a second of said pair of axial plane bearings.

17. A belt tensioner according to claim 16, wherein said belt exerts a force $F_1$ on said idler pulley, said coil spring exerts a force $F_2$ on said retainer, and said Belleville spring exerts a force $F_3$ on said retainer essentially parallel to said first axis of rotation, whereby the forces $F_2$ and $F_3$ counter force $F_1$, such that the resultant force $F_R$ is aligned with said radial plane bearing at an axial center thereof, preventing tilting movement of said retainer relative to said bearing pin.

18. A belt tensioner according to claim 17, wherein each of said pair of axial plane bearings is coated with PTFE.

19. A belt tensioner comprising:
a cup shaped base section having a hollow bearing pin and a thrust pad;
a retainer pivotally mounted on said bearing pin for rotation about a first axis, said retainer comprising a bearing bush having a radial plain bearing frictionally engaging said bearing pin and an opposed pair of axial plain bearings, said retainer being movable in an axial direction along said bearing pin, and said retainer having an idler pulley mounted for rotation about a second axis, said second axis being offset from and parallel to said first axis;
a coil spring extending between said base section and said retainer, said coil spring urging said retainer to rotate about said first axis and bias said idler pulley into engagement with a belt;
a spring bush and a coil bush supporting said coil spring on said retainer and said base section, respectively;
a locking piece forming a locking joint on a free end of said bearing pin and presenting a hollow passageway through said tensioner enabling said tensioner to be mounted on an engine part;
a damper washer mounted about said bearing pin and disposed between said locking piece and a first of said pair of axial plane bearings;
a Belleville spring mounted about said bearing pin, said Belleville spring engaging said thrust pad and axially urging said retainer towards said locking piece; and
a supporting ring mounted on said bearing pin, said supporting ring engaging said Belleville spring and a second of said pair of axial plane bearings;
wherein said belt exerts a force $F_1$ on said idler pulley, said coil spring exerts a force $F_2$ on said retainer, and said Belleville spring exerts a force $F_3$ on said retainer essentially parallel to said first axis of rotation, whereby the forces $F_2$ and $F_3$ counter force $F_1$, such that the resultant force $F_R$ is aligned with said radial plane bearing at an axial center thereof, preventing tilting movement of said retainer relative to said bearing pin.

20. A belt tensioner according to claim 19, wherein said damper washer comprises a glass-fibre reinforced plastic.

* * * * *